Nov. 12, 1935.  K. SATOW  2,020,577
AUTOMOBILE SIGNAL
Filed April 11, 1933  2 Sheets-Sheet 1
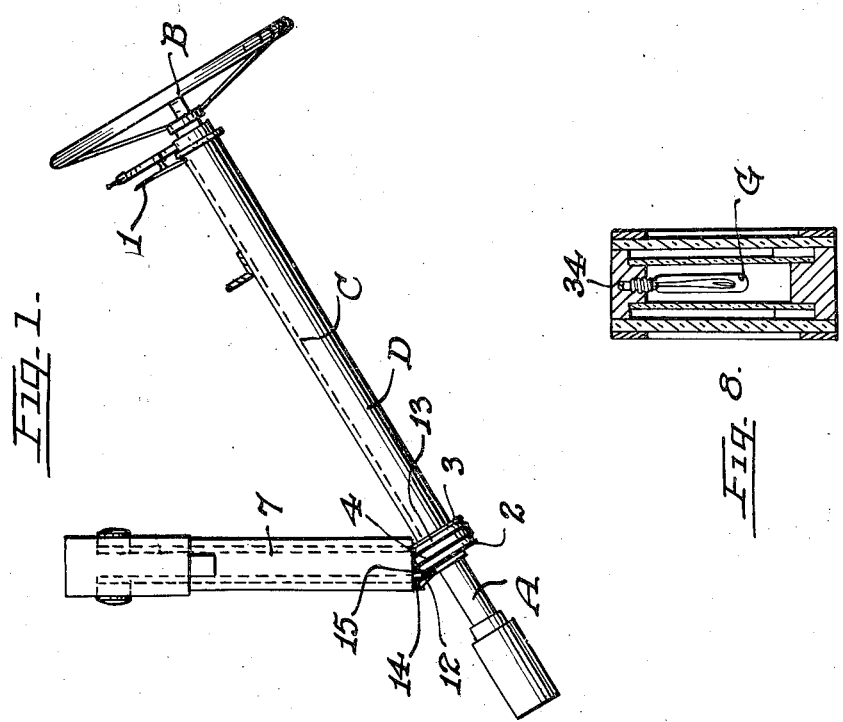
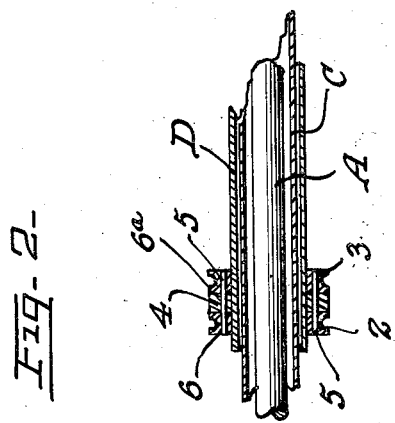
Inventor
Katsuke Satow
By R. M. Thomas
Attorney Nov. 12, 1935.  K. SATOW  2,020,577
AUTOMOBILE SIGNAL
Filed April 11, 1933  2 Sheets-Sheet 2
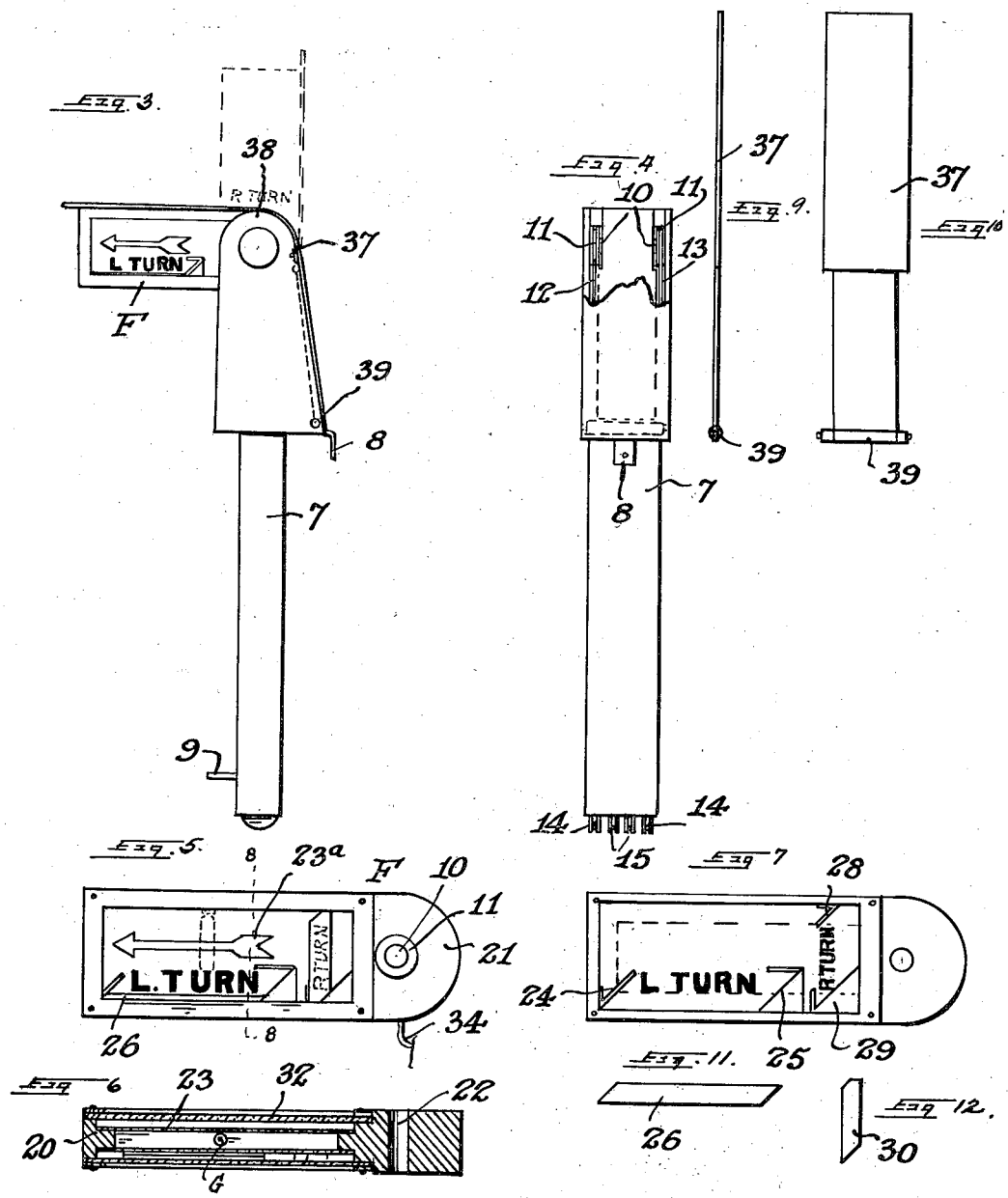
Inventor
Katsuke Satow
By R. M. Thomas
Attorney Patented Nov. 12, 1935

2,020,577

UNITED STATES PATENT OFFICE 2,020,577

AUTOMOBILE SIGNAL

Katsuhe Satow, Price, Utah

Application April 11, 1933, Serial No. 665,472

4 Claims. (Cl. 116—45)

My invention relates to signaling devices and has for its object to provide a new and efficient semaphore signal for automobiles which is efficient in its operation, decorative in appearances and which will or may be used to warn the driver approaching from in front or from the rear that the driver of the car is intending to turn it either to the right or to the left.

A further object is to provide a signaling device having the control on the steering column and also having lighting means for illuminating the device for night driving.

A still further object is to provide a signaling device for automobiles which will be automatic in its action of covering the wording thereon so that when the driver wishes to turn to the left the letters "R. Turn" will be covered and when he moves the device to indicate his intention to turn to the right the letters "L. Turn" will be covered.

These objects I accomplish with the device illustrated in the accompanying drawings in which similar numerals and letters of reference indicate like parts throughout the several views. The invention is described in the specification forming a part of this application and pointed out in the appended claims.

In the drawings in which I have shown my device, Figure 1 is a side elevation of the steering wheel, column and my attachments shown thereon with a side elevation of the signaling device shown back of the steering column or on the other side thereof. Figure 2 is a sectional view of one portion of the steering column and the means for connecting the signal with the control on the column.

Figure 3 is a side elevation of the signal standard with the signal indicating a left turn. Figure 4 is a side elevation of Figure 3. Figure 5 is a face view of the signal element showing the method of covering the lettering. Fig. 6 is a sectional view of Figure 5. Figure 7 is a plan view of Figue 5 to show the figure with the frames for guiding the cover plates, the plates being removed. Figure 8 is a section on line 8—8 of Figure 5. Figure 9 is a side elevation of the shield for the signal section. Figure 10 is a face view of Figure 9. Figure 11 is a plan view of the plate used to control the left turn signal. Figure 12 is a plan view of the plate used to control the right turn signal.

In the drawings I have shown the steering post as A, the wheel as B, the cylindrical column surrounding the post as C and my rotatable sleeve as D. The sleeve D surrounds the column and is operated by the driver by a handle 1, extending radially therefrom. At the bottom end of the sleeve D, I provide spaced apart sheave wheels 2 and 3 mounted on the sleeve D on each side of a collar 4. The collar 4 is fixed to the sleeve and the sheave wheels are secured to the collar by passing pins 5 through holes 6 in the sheave wheels and holes 6a in the collar. This provides means for adjusting the sheave wheels.

The signal portion of the device consists of a vertical column or stand 7 supported by brackets 8 and 9, from the fender or body of the car outside the body and the column is hollow with sheave wheels mounted in the bottom end thereof. At the top of the column I secure a guard body in which the signal element rests and is enclosed when not used for signaling. Transversely across the top of the body I provide a shaft 10 onto which the signal element F is secured. On each side of the element F on the shaft 10 I provide sheave wheels 11 and to operate the signal I then provide cables 12 and 13 operating simultaneously with each partial rotation of the sleeve D to actuate the warning signal. One cable might be sufficient to operate the device, but the two are provided to insure that the warning signal will operate as desired and there will be no slipping of the cables. Thus, beginning at the sleeve D one cable 12 encircles the sheave 2, and then is carried over and around one sheave 14, of one pair of sheaves in the bottom of the column 7, up around the sheave 11 on the shaft 10, back down the column and around one of the sheaves 15, back to the sheave 2 at the place of beginning. The other cable 13 begins around the sheave 3 and is trained across and around the other sheave 14 up the column 7 and around the sheave 11 on the other side of the signal element, back down the column around the other sheave 15 and back to the sheave 3 to the beginning. The signal body shield has the back side closed and allows the signal to move out of one side. The signal is made of a body 20 having the medial portion removed to make a framework of the body with one end semicircular at 21 and bored at 22 to be secured onto the shaft 10. Each side of the body is alike so that the signal may be seen from in front as well as from the rear of the automobile. The opening in the framework is formed with steps around the inner periphery on each side thereof and onto the first step I secure a plate of glass 23 on which direction arrows 23a are secured or painted. Along one side of the glass I provide the letters or words indicating a left turn, those shown being "L. Turn". At each end of the printed matter or legend and at the outer side of the glass I then secure angled guide members 24 and 25 and within the space thus enclosed I place a letter covering plate 26 made half the width encompassed by the guides so that the plate will not cover the lettering when the signal element is in the horizontal position, but sliding down the guides when the signal is raised to the vertical position projecting above the guard body the plate will cover the letters so that they cannot be seen. Across the bottom end of the glass which is lowermost when the signal is in its uppermost position, I then provide the letters indicating a right turn those shown being "R. Turn". Also at each end of these letters I mount similar plate guides 28 and 29 and a plate 30 is carried within the guides to cover the letters or legend "R. Turn" when the device is in horizontal position but to slide down revealing the letters "R. Turn" when the signal element is raised to the vertical position.

On each side of the signal 20 outside the plates of glass 23 and the covering plates 26 and 30 there is a cover glass 32 to shield the action of the device but make the letters visible therethrough.

Within the casing there is a light globe G and this is connected with a control switch on the sleeve or steering column by a set of suitable wires 34. Onto one side of the signal element I secure one end of a shield plate 37 with the other end of the plate carried around the curved end 38 of the guard body and attached to a spring controlled roller 39, the tension of the spring tending to normally hold the signal element in the vertical position with the shield closed down over the back. This spring tension also helps to hold the signal element and to aid in the operation thereof. The roller 39 will be provided with a coil spring therein similar to the type used in common window blinds. When the signal is in the closed position or down within the guard body the shield plate entirely closes the outside face of the body.

The operation of my device is as follows:—

To indicate a turn the operator moves the handle 1 rotating the sleeve D which in turn rotates the sheave wheels 2 and 3 and actuates the cables 12 and 13 which actuates the signal element to the desired position. The handle 1 will be notched to indicate a left turn or a right turn and the operator will know just how far to turn the handle to get the desired position. The light globe might also be controlled by the operator from the steering post by a switch mounted thereon.

Having thus described my invention I desire to secure by Letters Patent and claim:—

1. In a direction signal for motor vehicles, the combination of a cylindrical column surrounding the steering column of a vehicle; a collar carried on said column; sheave wheels secured to said collar on each side thereof; a signal standard secured to one side of said vehicle; a signal element mounted in the top of said standard, said signal to be partially rotated in said standard to horizontal or perpendicular position; sheave wheels fixed with respect to said signal element; sheave wheels mounted at the bottom of said standard and cables passed, around the sheave wheels of the signal element, down around certain ones at the bottom of the standard, across and around the sheave wheels on the cylindrical column, back around the other wheels at the bottom of the standard and back to the point of beginning: whereby the rotation of the cylindrical column will actuate the signal element.

2. In a signal structure for automobiles, the combination of a pivoted body frame; a plate of glass carried on each side of a step in said body frame having direction lettering thereon and an arrow thereon; guides carried in said body outside each glass plate; and cover plates carried in said guides to expose or cover said lettering as said body is pivoted to or from a predetermined signaling position.

3. In a signal structure, the combination of a transparent member having turn indicating legends applied thereto; means mounting said member for swinging movement from a non-signaling position to a plurality of signaling positions; guide members arranged adjacent said legends, and gravity actuated plates mounted in said guides and slidable to and from positions before the respective legends, the legends and plates being so arranged that in each of said signaling positions of the transparent member the appropriate one of said legends only will be exposed in normal reading position, while the other legends will be covered by their plates.

4. In a signal structure, the combination of a signal element having a turn indicating legend arranged longitudinally thereof and a turn indicating legend arranged transversely thereof and gravity controlled plates slidable to conceal or expose the corresponding legends, each plate being arranged to move away from in front of its legend when the signal element is arranged in position to present such legend in normal reading position and to cover such legend when the signal member is moved from said position.

KATSUHE SATOW.